US012577800B2

(12) United States Patent
Kasuga et al.

(10) Patent No.: US 12,577,800 B2
(45) Date of Patent: Mar. 17, 2026

(54) WIND POWER GENERATION TOWER AND CONSTRUCTION METHOD OF WIND POWER GENERATION TOWER

(71) Applicant: SUMITOMO MITSUI CONSTRUCTION CO., LTD., Tokyo (JP)

(72) Inventors: Akio Kasuga, Tokyo (JP); Aibek Tokrorbai Uulu, Tokyo (JP); Long Doan Sy, Tokyo (JP)

(73) Assignee: Sumitomo Mitsui Construction Co., Ltd., Tokyo (JP)

( * ) Notice: Subject to any disclaimer, the term of this patent is extended or adjusted under 35 U.S.C. 154(b) by 164 days.

(21) Appl. No.: 18/569,820

(22) PCT Filed: Jun. 23, 2022

(86) PCT No.: PCT/JP2022/025143
§ 371 (c)(1),
(2) Date: Dec. 13, 2023

(87) PCT Pub. No.: WO2023/282086
PCT Pub. Date: Jan. 12, 2023

(65) Prior Publication Data
US 2024/0287827 A1      Aug. 29, 2024

(30) Foreign Application Priority Data
Jul. 8, 2021      (JP) ................................. 2021-113270

(51) Int. Cl.
*E04H 12/34* (2006.01)
*E04H 12/08* (2006.01)
(Continued)

(52) U.S. Cl.
CPC ............. *E04H 12/34* (2013.01); *E04H 12/08* (2013.01); *E04H 12/12* (2013.01); *F03D 13/201* (2023.08); *F05B 2240/912* (2013.01)

(58) Field of Classification Search
CPC ......... E04H 12/34; E04H 12/08; E04H 12/12; E04H 12/344; F03D 13/201; F03D 13/112; F05B 2240/912
See application file for complete search history.

(56) References Cited

U.S. PATENT DOCUMENTS 861,244 A  *  7/1907  Allen .................. E02B 17/0008
52/295
1,647,925 A  *  11/1927  May ........................ E02D 27/42
52/294
(Continued)

FOREIGN PATENT DOCUMENTS

ES            2319709 A1 *  5/2009  ............. F03D 80/00
JP        2009-057713 A       3/2009
(Continued)

*Primary Examiner* — Brent W Herring
(74) *Attorney, Agent, or Firm* — Carrier, Shende & Associates P.C.; Joseph P. Carrier; Fulchand P. Shende

(57) ABSTRACT

A wind power generation tower for supporting a wind power generator in mid-air includes a tower lower portion that includes at least three legs made of hollow concrete and erected on a foundation so as to tilt toward each other, a tower intermediate portion arranged in a center of the at least three legs in a plan view, and a tower upper portion protruding upward from the tower intermediate portion to support the wind power generator. The tower intermediate portion is made of cone-shaped hollow concrete, and includes a lower end supported by the legs and an upper end thinner than the lower end. The tower upper portion is made of a steel pipe, and includes a lower half portion supported by the upper end of the tower intermediate portion and an exposed body portion.

6 Claims, 6 Drawing Sheets

(51) Int. Cl.
  E04H 12/12 (2006.01)
  F03D 13/20 (2016.01)

(56) References Cited

U.S. PATENT DOCUMENTS

| | | | | | |
|---|---|---|---|---|---|
| 7,993,107 | B2 * | 8/2011 | Gevers | .................... | E04H 12/08 |
| | | | | | 248/163.1 |
| 8,297,025 | B2 * | 10/2012 | Huynh Tuong | ......... | E04H 12/12 |
| | | | | | 52/848 |
| 2009/0307998 | A1 * | 12/2009 | Zavitz | .................... | E04H 12/12 |
| | | | | | 52/745.19 |
| 2011/0314750 | A1 * | 12/2011 | Nies | ........................ | F03D 13/25 |
| | | | | | 52/651.07 |
| 2015/0167645 | A1 * | 6/2015 | Jensen | .................... | F03D 13/20 |
| | | | | | 416/244 R |
| 2016/0075413 | A1 * | 3/2016 | Nebrera Garcia | .... | E02D 27/425 |
| | | | | | 114/122 |
| 2018/0170488 | A1 | 6/2018 | Fernandez Gomez et al. | | |

FOREIGN PATENT DOCUMENTS

| | | | |
|---|---|---|---|
| JP | 2017-516945 | A | 6/2017 |
| WO | 2013/083802 | A2 | 6/2013 |

* cited by examiner

WIND POWER GENERATION TOWER AND CONSTRUCTION METHOD OF WIND POWER GENERATION TOWER

TECHNICAL FIELD

The present invention relates to a wind power generation tower for supporting a wind power generator in mid-air, and a construction method of the wind power generation tower.

BACKGROUND ART

In recent years, with increasing awareness of environmental issues, wind power generation has become popular in various regions as a means of generating electricity using renewable energy. A wind power generation device includes a wind power generator including a rotor and a nacelle, and a wind power generation tower for supporting the wind power generator in mid-air. The wind power generation device is constructed in a place with good geographical conditions to receive sufficient wind. Generally, the higher a place gets, the higher the wind speed becomes. Accordingly, there is a growing need to place the wind power generation tower higher so as to improve power generation efficiency.

A hybrid tower for wind power generation is known as a wind power generation tower to meet such a need (Patent Document 1). This hybrid tower for wind power generation includes a tower lower portion having a concrete structure with high rigidity and a tower upper portion having a steel structure with excellent construction properties. More specifically, the tower lower portion is made of prestressed concrete, and the tower upper portion is made of a steel cylinder attached thereto. According to this configuration, it is expected that a wind power generation tower with a height of over 70 m (for example, 100 m) can be realized.

The construction method of this hybrid tower comprises a concrete tube placing process in the tower lower portion, a prestress applying process in the tower lower portion, and a steel cylinder attaching process in the tower upper portion. In the concrete tube placing process, an inner form and an outer form are placed on a footing, and a concrete tube is constructed vertically in sequence as concrete is placed into the forms. In the prestress applying process, a PC steel material is arranged between a fixing device arranged in the footing and a fixing portion arranged at the top of the concrete tube that has reached a prescribed length. As the PC steel material is tensioned, prestress is applied to the concrete tube. In the steel cylinder attaching process, the steel cylinder is attached vertically onto the concrete tube.

PRIOR ART DOCUMENT(S)

Patent Document(s)

Patent Document 1: JP2009-57713A

SUMMARY OF THE INVENTION

Task to be Accomplished by the Invention

However, in the abovementioned conventional technique, if the height of the concrete structure of the tower lower portion is increased to increase the height of the wind power generation tower, there is a risk that the concrete structure may lack rigidity. So as to resolve the lack of rigidity, the cross-sectional shape of the concrete structure may get larger toward the bottom. However, such a configuration increases the volume and weight of the concrete structure. Accordingly, it is necessary to increase the size of a foundation that supports the wind power generation tower.

Further, in the abovementioned conventional technique, the wind power generation tower is constructed in order from the bottom. Accordingly, a crane higher than the wind power generation tower is needed to place the steel cylinder at the top of the tower or to place the wind power generator mounted thereon. Accordingly, the height of the wind power generation tower is limited by the height of the crane.

In view of the above background, an object of the present invention is to inhibit the weight of a wind power generation tower and the size of a foundation from increasing and to construct a wind power generation tower without limitation imposed by the height of the crane.

Means to Accomplish the Task

To achieve such an object, one aspect of the present invention provides a wind power generation tower (5) for supporting a wind power generator (4) in mid-air, comprising: a tower lower portion (11) that includes at least three legs (14) made of hollow concrete and erected on a foundation (8) so as to tilt toward each other; a tower intermediate portion (12) made of cone-shaped hollow concrete, arranged in a center of the at least three legs (14) in a plan view, and including a lower end (12a) supported by the legs (14) and an upper end (12b) thinner than the lower end (12a); and a tower upper portion (13) made of a steel pipe, protruding upward from the tower intermediate portion (12) to support the wind power generator (4), and including a lower half portion (13a) supported by the upper end (12b) of the tower intermediate portion (12) and an exposed body portion (13b).

In this specification, "made of concrete" does not mean "made only of concrete", but means "a structure that includes concrete". Accordingly, "made of concrete" includes a reinforced concrete structure, a fiber reinforced concrete structure, a reinforced steel-frame structure, a prestressed concrete structure, a precast concrete structure, a cast-in-place concrete structure, and the like.

According to this aspect, the tower lower portion and the tower intermediate portion are made of hollow concrete. Thus, the rigidity required for the wind power generation tower can be easily ensured, so that the height of the wind power generation tower can be increased. Further, the tower lower portion includes the at least three legs made of hollow concrete. Accordingly, the amount of concrete in the tower lower portion is reduced, so that the weight of the wind power generation tower and the size of the foundation can be inhibited from increasing. Further, the tower upper portion is made of a steel pipe, so that the flexibility required for the wind power generation tower can be easily ensured.

In the above aspect, preferably, the tower intermediate portion (12) has at least three flat surfaces (17) formed at equal intervals in a circumferential direction on an outer circumferential surface of the lower end (12a), and each leg (14) has a flat joined surface (18) facing the tower intermediate portion (12), and is fastened to the tower intermediate portion (12) by a tensioner (20) in a state where the joined surface (18) is opposed to the corresponding flat surface (17).

According to this aspect, the tower intermediate portion and each leg can be securely fastened.

In the above aspect, preferably, a filler (19) is filled between the joined surface (18) of the leg (14) and the flat surface (17) of the tower intermediate portion (12).

According to this aspect, the leg and the tower intermediate portion can be fastened together in a state of being firmly stuck to each other as a gap caused by manufacturing errors or construction errors is filled with the filler.

In the above aspect, preferably, the wind power generation tower (5) further comprises supporting members (15) configured to rotatably support the legs (14) on the foundation (8).

According to this aspect, the legs can be rotated, so that the legs and the tower intermediate portion can be easily joined.

To achieve the abovementioned object, one aspect of the present invention provides a construction method of the wind power generation tower (5) according to the above-mentioned aspects, the construction method comprising the steps of: constructing the tower upper portion (13) and the tower intermediate portion (12) in an area (21) to be surrounded by the legs (14) (see (B)-(C) of FIG. 4); causing the tower upper portion (13) to support the wind power generator (4) (see (B) of FIG. 4); constructing the at least three legs (14) upward and substantially vertically (see (D) of FIG. 5); lifting both the tower upper portion (13) supporting the wind power generator (4) and the tower intermediate portion (12) to a prescribed mid-air position (see (F) of FIG. 5); rotating the at least three legs (14) on the foundation (8) so as to tilt the three legs toward each other and causing upper portions (14b) of the legs (14) to abut against the lower end (12a) of the tower intermediate portion (12) that is in the mid-air position (see (G) of FIG. 6); and joining each of the upper portions (14b) of the legs (14) to the lower end (12a) of the tower intermediate portion (12) and thereby causing the tower lower portion (11) to support the tower intermediate portion (12) (see (H) of FIG. 6).

According to this aspect, the wind power generator is supported by the tower upper portion before the tower upper portion and the tower intermediate portion are lifted to the prescribed mid-air position. Accordingly, it is not necessary to use a crane higher than the wind power generation tower to arrange the tower upper portion and the wind power generator. Accordingly, the wind power generation tower can be constructed without limitation imposed by the height of the crane.

In the above aspect, preferably, the construction method further comprises the steps of: attaching a balance weight (24) to the lower end (12a) of the tower intermediate portion (12) before lifting both the tower upper portion (13) and the tower intermediate portion (12) to the mid-air position (see (E) of FIG. 5); and removing the balance weight (24) from the lower end (12a) of the tower intermediate portion (12) after joining each of the upper portions (14b) of the legs (14) to the lower end (12a) of the tower intermediate portion (12) (see (I) of FIG. 6).

According to this aspect, when the tower upper portion and the tower intermediate portion are lifted to the mid-air position, the postures of the tower upper portion and the tower intermediate portion can be stabilized.

In the above aspect, preferably, in the step of constructing the tower upper portion (13) and the tower intermediate portion (12) (see (B)-(C) of FIG. 4), arranging a nacelle (3) of the wind power generator (4), and constructing the tower upper portion (13) and the tower intermediate portion (12) in order from a top while jacking up a constructed portion of the tower upper portion (13) and the tower intermediate portion (12) below the nacelle (3).

According to this aspect, the work of arranging the nacelle and the work of joining the nacelle and the tower upper portion can be performed at a lower position. Accordingly, it is not necessary to prepare a large crane with a large lifting height, so that construction costs can be reduced.

Effect of the Invention

Thus, according to the above aspects, it is possible to inhibit the weight of a wind power generation tower and the size of a foundation from increasing and to construct a wind power generation tower without limitation imposed by the height of the crane.

BRIEF DESCRIPTION OF THE DRAWING(S)

MODE(S) FOR CARRYING OUT THE INVENTION

In the following, an embodiment of the present invention will be described in detail with reference to the drawings.

Figure 1:
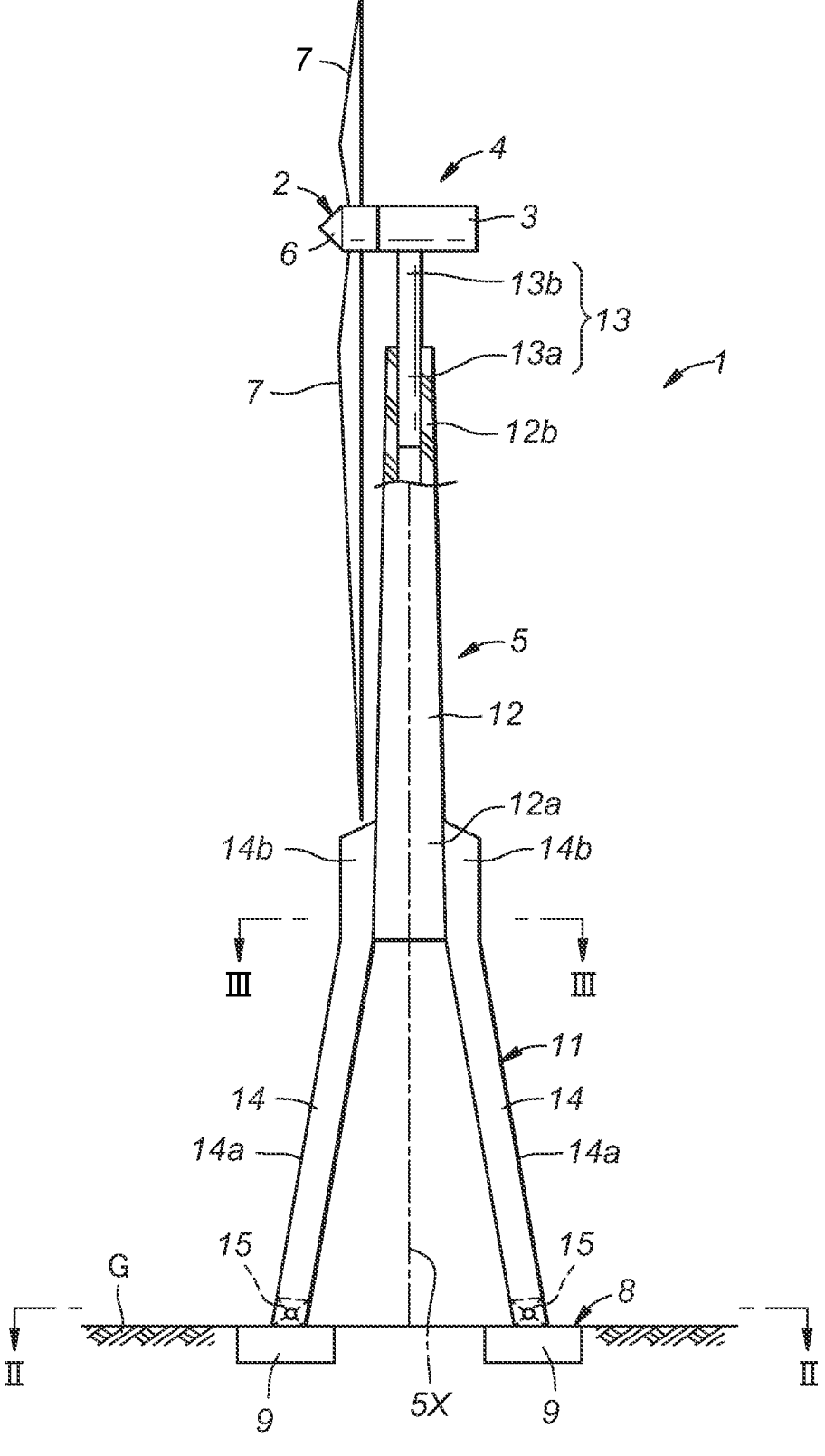
FIG. 1 is a side view of a wind power generation device according to an embodiment.

FIG. 1 is a side view of a wind power generation device 1 according to the embodiment. As shown in FIG. 1, the wind power generation device 1 includes a wind power generator 4 including a rotor 2 and a nacelle 3, and a wind power generation tower 5 for supporting the wind power generator 4 in mid-air. The wind power generation device 1 of the present embodiment is configured as a land wind power generation facility built on land. In another embodiment, the wind power generation device 1 may be configured as a floor-mounted offshore wind power generation facility built on the ocean.

The rotor 2 includes a hub 6 having an axis in the horizontal direction, and a plurality of blades 7 extending radially from the hub 6 and arranged around the axis of the hub 6. The rotor 2 rotates around the axis of the hub 6 as the blades 7 receive wind. The nacelle 3 supports the rotor 2 such that the rotor 2 is rotatable around the axis. The nacelle 3 internally includes an accelerator to which the rotor 2 is connected on an input side thereof, and a generator connected to an output side of the accelerator. When the rotor 2 rotates, the nacelle 3 accelerates the rotation using the accelerator, and generates electricity using the generator.

Figure 2:
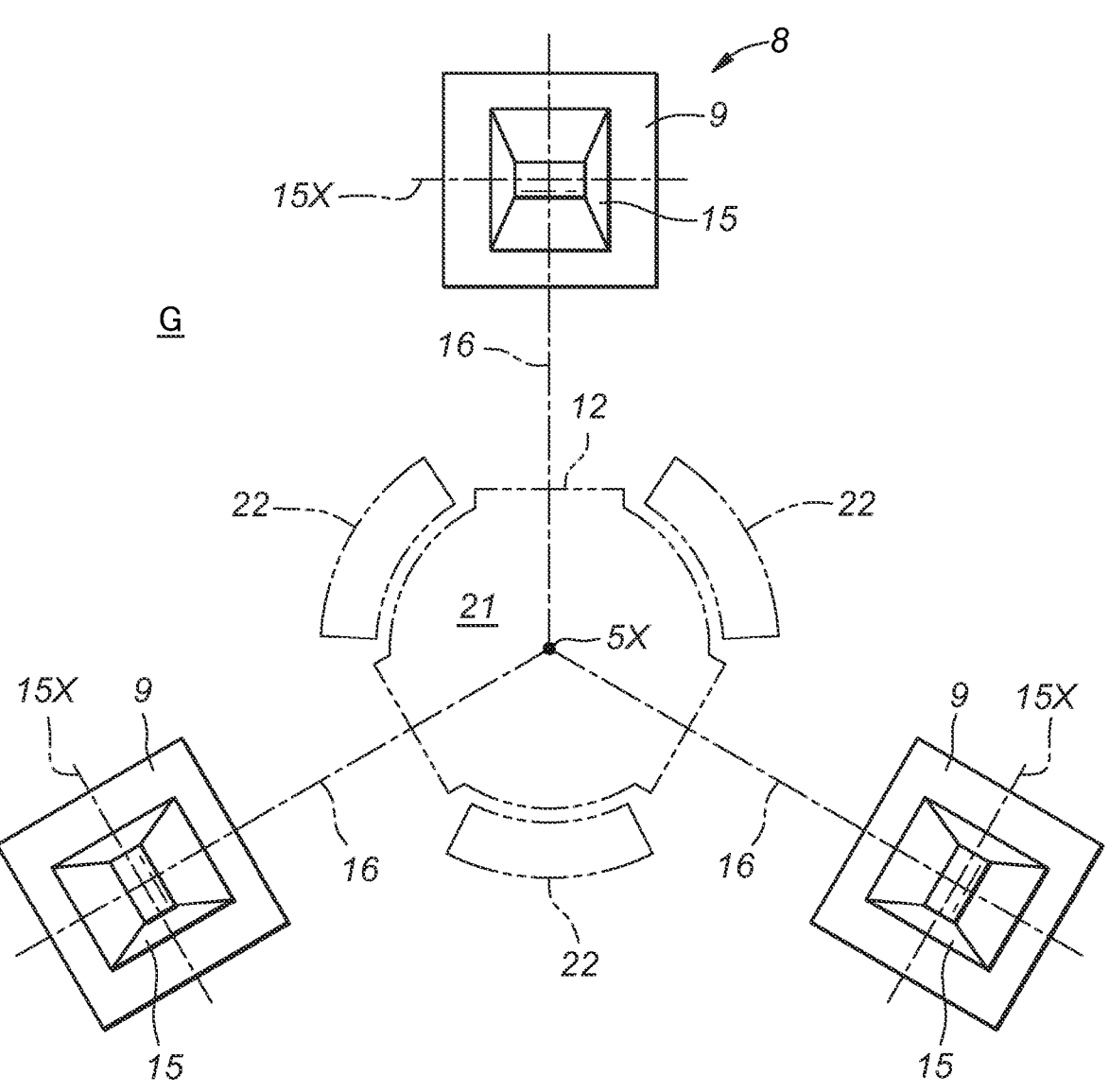
FIG. 2 is a cross-sectional view along a line II-II in FIG. 1.

FIG. 2 is a cross-sectional view along a line II-II in FIG. 1. As shown in FIGS. 1 and 2, the wind power generation device 1 is built on a foundation 8 (supporting structure) built on the ground G. The foundation 8 includes three footings 9. The three footings 9 are arranged at positions equally spaced in the radial direction from a center 5X in a plan view of the wind power generation tower 5. Further, the three footings 9 are arranged at equal intervals (120° interval) on the circumference. These three footings 9 may be connected to each other by underground beams (not shown).

The wind power generation tower 5 includes a tower lower portion 11 supported by the foundation 8, a tower intermediate portion 12 supported by the tower lower portion 11, and a tower upper portion 13 supported by the tower intermediate portion 12 and supporting the wind power generator 4.

The tower lower portion 11 includes three legs 14 made of hollow concrete and erected on the footings 9 so as to tilt toward each other. In other words, the tower lower portion 11 forms a tripod structure including the three legs 14. Each leg 14 has a leg body portion 14a that tilts relative to a vertical line, and a leg upper portion 14b extending substantially vertically and upward from an upper end of the leg body portion 14a.

A supporting member 15 is provided at a lower end of each leg 14. In the present embodiment, the supporting member 15 is embedded in concrete and configured as an extension that extends the leg 14 downward. In another embodiment, the supporting member 15 may not be embedded in concrete, but may be exposed.

The supporting member 15 is a rotatably supporting member that rotatably supports the leg 14 on the foundation 8 in a state before being embedded in concrete. The supporting member 15 has a rotational axis 15X that extends in the horizontal direction. The supporting member 15 is arranged such that the rotational axis 15X is perpendicular to a virtual line 16 extending from the center 5X of the wind power generation tower 5 toward the supporting member 15. In this way, the leg 14 is rotatably supported by the supporting member 15 around the rotational axis 15X, and thus is tiltable such that the upper portion of the leg 14 approaches or moves away from the center 5X of the wind power generation tower 5.

The tower intermediate portion 12 is arranged in the center of the three legs 14 in a plan view. The tower intermediate portion 12 is made of cone-shaped hollow concrete, and includes a lower end 12a supported by the legs 14 and an upper end 12b thinner than the lower end 12a. Further, in FIG. 2, the contours of the lower end 12a of the tower intermediate portion 12 projected vertically downward from above is shown by an imaginary line.

Figure 3:
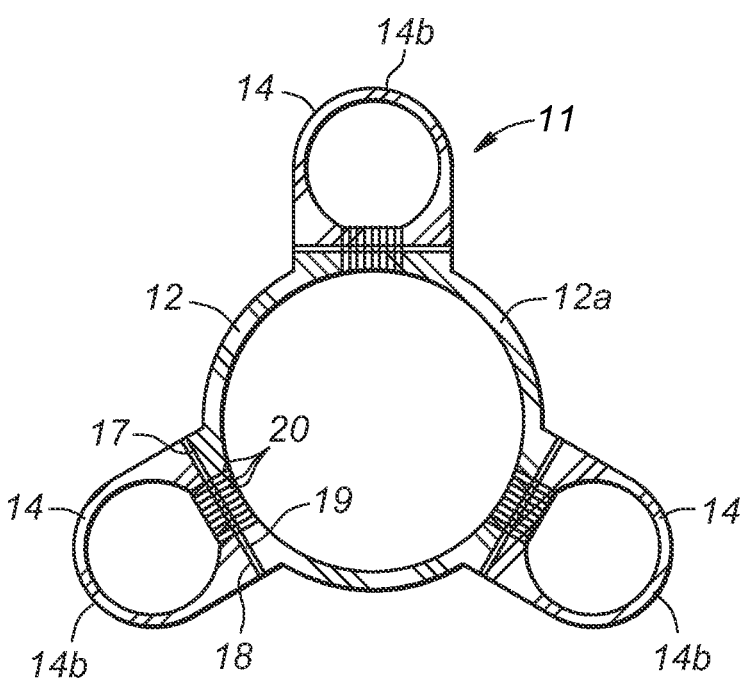
FIG. 3 is a cross-sectional view along a line III-III in FIG. 1.

FIG. 3 is a cross-sectional view along a line III-III in FIG. 1. As shown in FIGS. 1 and 3, the tower intermediate portion 12 has three flat surfaces 17 formed at equal intervals in the circumferential direction on an outer circumferential surface of the lower end 12a. Each leg 14 has, in the leg upper portion 14b, a flat joined surface 18 facing the tower intermediate portion 12. The leg upper portion 14b is arranged such that the joined surface 18 is opposed to the corresponding flat surface 17. A filler 19 is filled between the joined surface 18 of the leg 14 and the flat surface 17 of the tower intermediate portion 12. The filler 19 is a filling material that has fluidity and hardening properties to harden over time, and may be formed of non-shrinkable mortar, for example. The leg upper portion 14b is fastened to the tower intermediate portion 12 by a tensioner 20 in a state where the joined surface 18 is opposed to the corresponding flat surface 17 via the filler 19. The tensioner 20 may be composed of, for example, a plurality of post tension bars (PT bars) made of steel rods.

As shown in FIG. 1, the tower upper portion 13 is made of a steel pipe, and protrudes upward from the tower intermediate portion 12. The tower upper portion 13 includes a lower half portion 13a supported by the upper end 12b of the tower intermediate portion 12, and a body portion 13b exposed between the tower intermediate portion 12 and the nacelle 3. The lower half portion 13a of the tower upper portion 13 is defined as a portion surrounded by the upper end 12b of the tower intermediate portion 12 on an entire circumference, and extends vertically inside the tower intermediate portion 12 over a prescribed height. The lower half portion 13a is joined to the upper end 12b of the tower intermediate portion 12, and thus the tower upper portion 13 is rigidly joined to the tower intermediate portion 12. The body portion 13b of the tower upper portion 13 extends upward from the tower intermediate portion 12 to a prescribed height, and is a portion that is the least rigid and the most flexible of the wind power generation tower 5. Moreover, the body portion 13b of the tower upper portion 13 is exposed, thereby functioning as a heat radiating portion that releases the heat of the nacelle 3 to the atmosphere.

The wind power generation tower 5 is configured as described above. Accordingly, it is possible to increase the height of the wind power generation tower 5 while inhibiting the weight of the wind power generation tower 5 and the size of the foundation 8 from increasing.

More specifically, the tower lower portion 11 and the tower intermediate portion 12 are made of hollow concrete. Thus, the rigidity required for the wind power generation tower 5 can be easily ensured, so that the height of the wind power generation tower 5 can be increased. Further, the tower lower portion 11 includes the three legs 14 made of hollow concrete. Accordingly, the amount of concrete in the tower lower portion 11 is reduced, so that the weight of the wind power generation tower 5 and the size of the foundation 8 can be inhibited from increasing. Further, the tower lower portion 11 is composed of the three legs 14, so that the legs 14 can be easily joined to the tower intermediate portion 12 to evenly support the load. Further, the tower upper portion 13 is made of a steel pipe, so that the flexibility required for the wind power generation tower 5 can be easily ensured.

The wind power generation tower 5 of the present embodiment may be configured with dimensions described below, although not limited thereto. The height (from the upper surface of the foundation 8 to the lower surface of the nacelle 3) of the wind power generation tower 5 may be 100 m or more, and may be 220 m, for example. The height (from the upper surface of the foundation 8 to the upper end 12b of the tower intermediate portion 12) of the tower lower portion 11 and the tower intermediate portion 12 may be 90 m or more, and may be 200 m, for example. In this case, the height of the exposed body portion 13b of the tower upper portion 13 may be approximately 10 m to 25 m. The height of the tower upper portion 13 may be approximately 15 m to 50 m.

The height of the tower intermediate portion 12 may be approximately 60 m to 140 m, and the height of the lower end 12a of the tower intermediate portion 12 supported by the legs 14 may be approximately 10 m to 30 m. The height of the tower lower portion 11 may be approximately 50 m to 120 m. The height of the leg body portion 14a may be approximately 40 m to 100 m, and the height of the leg upper portion 14b may be approximately 10 m to 30 m. The diameter of the lower end 12a of the tower intermediate portion 12 may be approximately 7.5 m to 17.5 m. The diameter of the upper end 12b of the tower intermediate portion 12 may be smaller than the diameter of the lower end 12a, and may be approximately 5 m to 12 m. The radius (from the center 5X of the wind power generation tower 5 to the center of a lower end of each leg 14) of the tower lower portion 11 may be approximately 12 m to 30 m.

For example, the radius of the rotor 2 may be approximately 50 m to 120 m, but is not limited thereto.

As shown in FIG. 3, the tower intermediate portion 12 has the three flat surfaces 17 formed at equal intervals in the circumferential direction on the outer circumferential surface of the lower end 12a. Each leg 14 has the flat joined surface 18 facing the tower intermediate portion 12, and is fastened thereto by the tensioner 20 in a state where the joined surface 18 is opposed to the corresponding flat surface 17. Accordingly, the tower intermediate portion 12 and the legs 14 can be securely fastened.

Furthermore, the filler 19 is filled between the joined surface 18 of the leg 14 and the flat surface 17 of the tower intermediate portion 12. Accordingly, the leg 14 and the tower intermediate portion 12 can be fastened together in a state of being firmly stuck to each other as a gap caused by manufacturing errors or construction errors is filled with the filler 19.

As also shown in FIG. 2, the wind power generation tower 5 includes the supporting members 15 configured to rotatably support the legs 14 on the foundation 8. Accordingly, the legs 14 can be rotated, so that the legs 14 and the tower intermediate portion 12 can be easily joined. This point will be described later.

Next, a construction method of the wind power generation device 1 according to the embodiment will be described.

Figure 4:
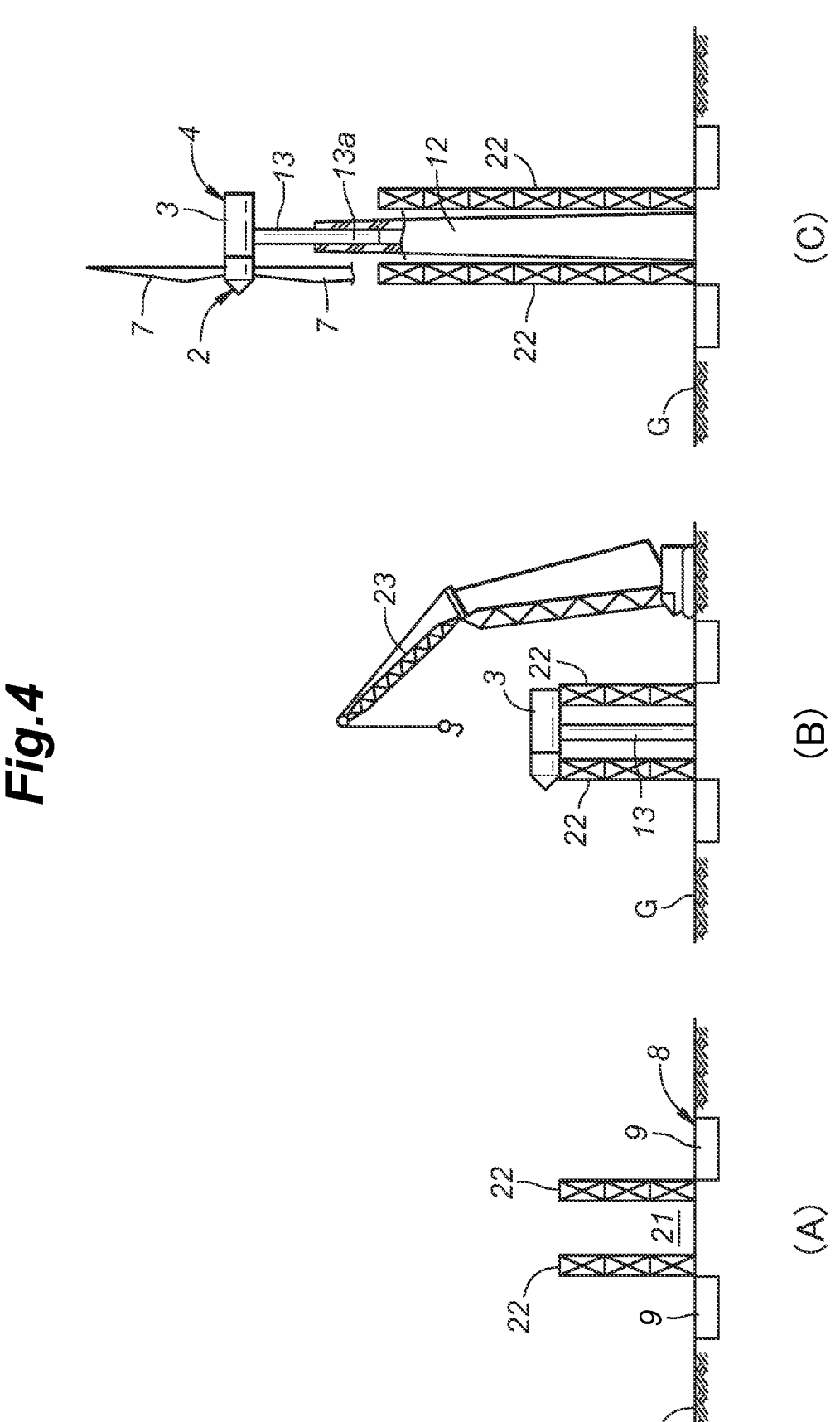
FIG. 4 is an explanatory diagram of a construction procedure of the wind power generation device according to the embodiment.
Figure 5:
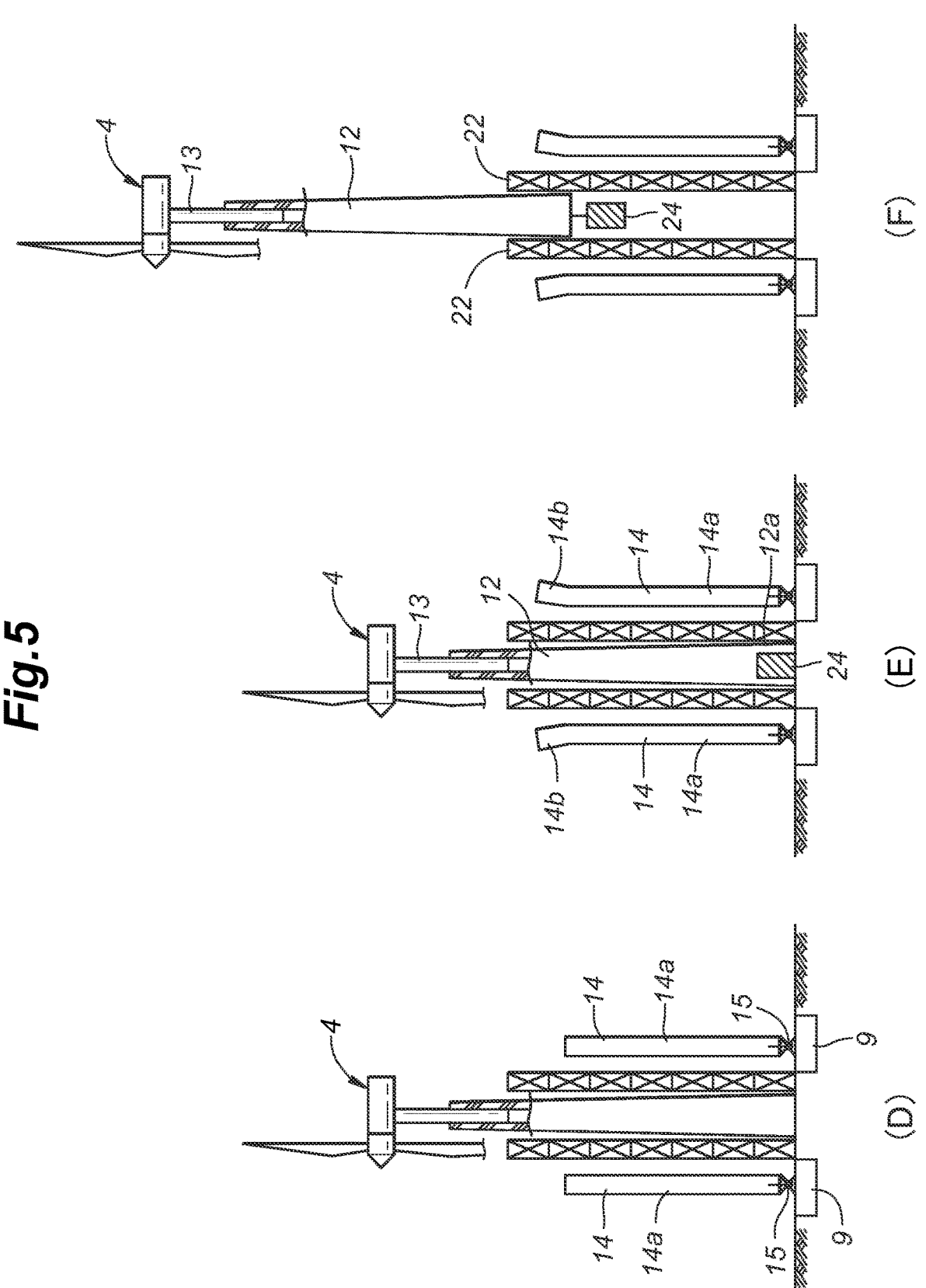
FIG. 5 is an explanatory diagram of the construction procedure of the wind power generation device according to the embodiment.
Figure 6:
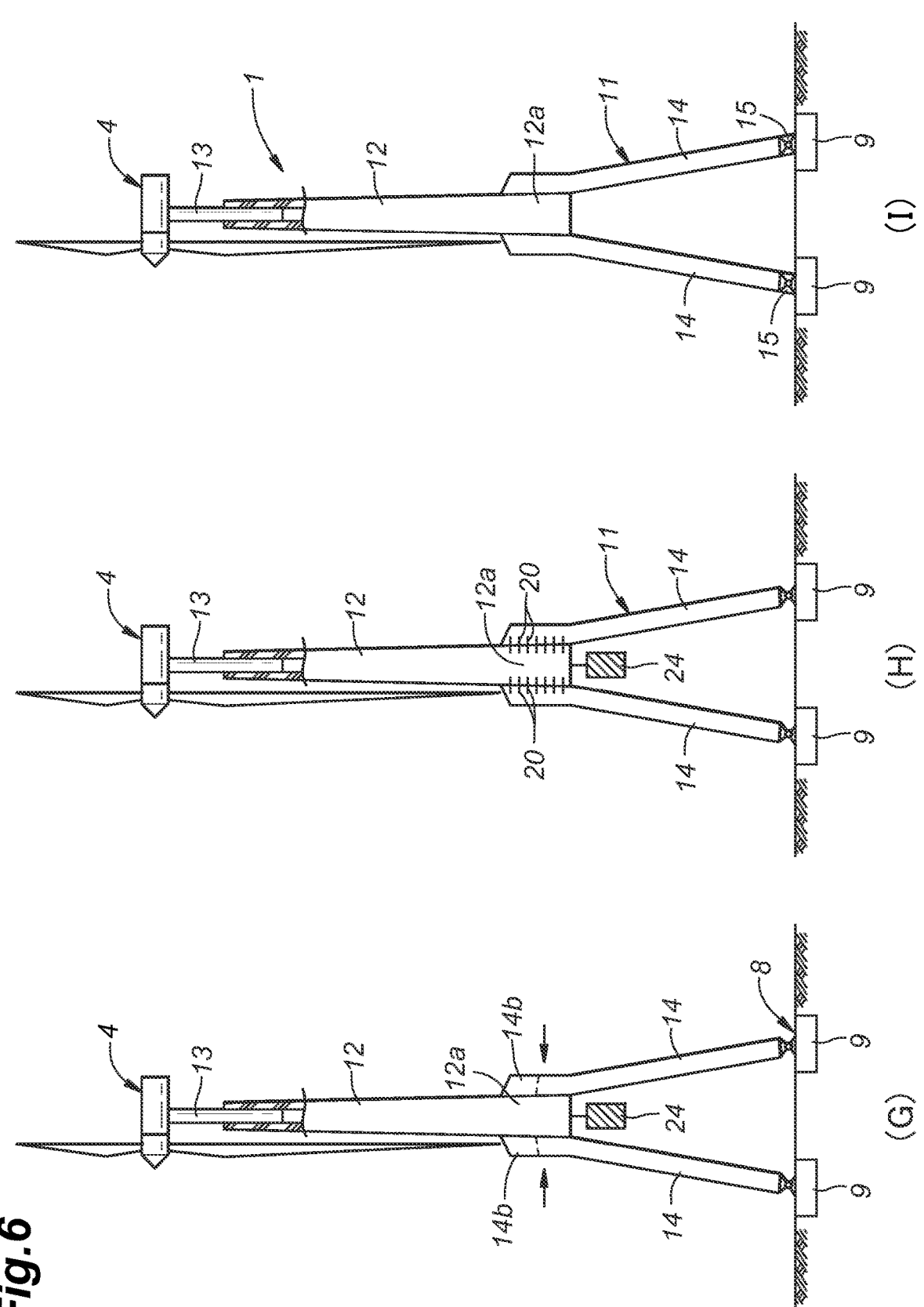
FIG. 6 is an explanatory diagram of the construction procedure of the wind power generation device according to the embodiment.

FIGS. 4 to 6 are explanatory diagrams of a construction procedure of the wind power generation device 1 according to the embodiment. The wind power generation device 1 is constructed by a worker according to the following procedure. As shown in (A) of FIG. 4, the worker first constructs the foundation 8, which includes the three footings 9, at a prescribed position of the ground G. Further, in the area 21 (See FIG. 2) to be surrounded by the legs 14, the worker assembles lift-up pedestals 22 for constructing the tower upper portion 13 and the tower intermediate portion 12. As shown in FIG. 2, the lift-up pedestals 22 are arranged on an outer circumferential side of the lower end 12a of the tower intermediate portion 12 having the largest cross-sectional dimension. The lift-up pedestals 22 are assembled at a lower portion, and extended upward at an appropriate timing. At least upper portions of the lift-up pedestals 22 are assembled in positions that do not overlap with the three legs 14 with respect to the circumference (the circumferential direction) of the center 5X of the wind power generation tower 5.

Next, as shown in (B) of FIG. 4, using a crane 23, the worker arranges the nacelle 3 on the lift-up pedestals 22 and erects the tower upper portion 13 on the ground G. Either the nacelle 3 or the tower upper portion 13 may be arranged first. After arranging the nacelle 3 and the tower upper portion 13, the worker joins a lower surface of the nacelle 3 to an upper end of the tower upper portion 13, thereby causing the tower upper portion 13 to support the nacelle 3.

Thereafter, as shown in (C) of FIG. 4, the worker constructs, on the ground G below the nacelle 3, the tower intermediate portion 12 while jacking up the tower intermediate portion 12 from the top so as to join the tower intermediate portion 12 to the lower half portion 13a of the tower upper portion 13. When the nacelle 3 is jacked up to the prescribed height, the worker attaches the rotor 2 including the blades 7 to the nacelle 3.

In this way, in the step of constructing the tower upper portion 13 and the tower intermediate portion 12 (see (B)-(C) of FIG. 4), the worker constructs the tower upper portion 13 and the tower intermediate portion 12 in order from the top while jacking up the tower upper portion 13 and the tower intermediate portion 12 below the nacelle 3. Accordingly, the work of arranging the nacelle 3 and the work of joining the nacelle 3 and the tower upper portion 13 can be performed at a lower position. Accordingly, it is not necessary to prepare a large crane with a large lifting height, so that construction costs can be reduced.

As shown in (D) of FIG. 5, on the three footings 9, the worker constructs the three legs 14 upward and substantially vertically. More specifically, the worker arranges and fixes the supporting members 15 on the footings 9. Each supporting member 15 may be preferably fixed by a locking member at an angle at which an upper surface thereof is arranged horizontally. In this state, the worker vertically constructs the leg body portion 14a of each leg 14 on the corresponding supporting member 15. If necessary, the worker may bind the leg body portion 14a with a support cable to prevent the constructed leg body portion 14a from falling down. For example, each leg 14 may be constructed by sequentially stacking a plurality of hollow precast concrete members using the crane 23 and joining the precast concrete members to each other by the tension force of PC tensioners. In another embodiment, each leg 14 may be constructed using cast-in-place concrete.

At this stage, as shown in (D) of FIG. 5, the worker may construct only the leg body portion 14a that can be constructed vertically, or may construct the entire leg 14. Alternatively, as shown in (E) of FIG. 5, the worker may construct, in addition to the leg body portion 14a, only a lower portion of the leg upper portion 14b to be constructed obliquely. In the present embodiment, at this stage, the worker constructs the leg body portion 14a and the lower portion of the leg upper portion 14b. The construction of the legs 14 shown in (D) of FIG. 5 may be performed at any time after the construction of the footings 9, and does not need to be performed after (C) in FIG. 4.

After the tower intermediate portion 12 is constructed in (C) of FIG. 4, the worker attaches a balance weight 24 to the lower end 12a of the tower intermediate portion 12, as shown in (E) of FIG. 5. Thereafter, as shown in (F) of FIG. 5, using the lift-up pedestals 22, the worker lifts both the tower upper portion 13 supporting the wind power generator 4 and the tower intermediate portion 12 to a prescribed mid-air position. The prescribed mid-air position is a position in the finished wind power generation tower 5 shown in FIG. 1.

In this way, the balance weight 24 is attached to the lower end 12a of the tower intermediate portion 12 in (E) of FIG. 5. Accordingly, when the tower upper portion 13 and the tower intermediate portion 12 are lifted to the mid-air position in (F) of FIG. 5, the postures of the tower upper portion 13 and the tower intermediate portion 12 can be stabilized.

Subsequently, as shown in (G) of FIG. 6, the worker rotates the three legs 14 on the foundation 8 so as to tilt (lower) the three legs 14 toward each other. The worker causes the leg upper portion 14b to abut against the lower end 12a of the tower intermediate portion 12 that is in the mid-air position. Next, as shown in (H) of FIG. 6, using the tensioner 20, the worker joins each leg upper portion 14b to the lower end 12a of the tower intermediate portion 12, and thereby causing the tower lower portion 11 to support the tower intermediate portion 12. More specifically, the worker constructs an unconstructed portion of each leg 14 on top of the constructed portion thereof. Subsequently, as shown in FIG. 3, the worker fills the filler 19 between the joined surface 18 of the leg 14 and the flat surface 17 of the tower intermediate portion 12. After the filler 19 hardens, the worker fastens the leg upper portion 14b of the leg 14 to the lower end 12a of the tower intermediate portion 12 by the tensioner 20 in a state where the joined surface 18 of the leg 14 is opposed to the corresponding flat surface 17 of the tower intermediate portion 12 via the filler 19.

As described above, the wind power generation tower 5 includes the supporting members 15. Accordingly, the rotation of the legs 14 shown in (G) of FIG. 6 is facilitated, so that the work of joining the legs 14 and the tower intermediate portion 12 to each other can be facilitated.

Finally, as shown in (I) of FIG. 6, the worker removes the balance weight 24 from the lower end 12a of the tower intermediate portion 12. Further, the worker dismantles the lift-up pedestals 22. In the present embodiment, the worker places concrete on the lower ends of the legs 14, and embeds the supporting members 15 in the concrete. Accordingly, the wind power generation device 1 shown in FIG. 1 is constructed.

As described above, in the construction method according to the embodiment, as shown in (B) of FIG. 4, the worker causes the tower upper portion 13 to support the wind power generator 4 before the tower upper portion 13 and the tower intermediate portion 12 are lifted to the prescribed mid-air position in (F) of FIG. 5. Accordingly, it is not necessary to prepare a large crane higher than the wind power generation tower 5 to arrange the tower upper portion 13 and the wind power generator 4. Accordingly, the wind power generation tower 5 can be constructed without limitation imposed by the height of the crane.

This concludes the explanation of the specific embodiment, but the present invention is not limited to the above-mentioned embodiment and its modifications, and can be widely modified. For example, in the above embodiment, the tower lower portion 11 includes the three legs 14, but may include four or more legs 14. Further, the specific configuration, arrangement, quantity, angle, material, procedure, and the like of each member and each portion can be changed as appropriate as long as these changes do not deviate from the aim of the present invention. Further, not all of the components shown in the above embodiment are necessarily essential, and these components can be selected as appropriate.

Glossary of Terms

1: wind power generation device
2: rotor
3: nacelle
4: wind power generator
5: wind power generation tower
8: foundation
9: footing
11: tower lower portion
12: tower intermediate portion
12a: lower end
12b: upper end
13: tower upper portion
13a: lower half portion
13b: body portion
14: leg
14a: leg body portion
14b: leg upper portion
15: supporting member
17: flat surface
18: joined surface
19: filler
20: tensioner
21: area
24: balance weight

The invention claimed is:

1. A wind power generation tower for supporting a wind power generator in mid-air, comprising:

a tower lower portion that includes at least three legs made of hollow concrete and erected on a foundation so as to tilt toward each other;

a tower intermediate portion made of cone-shaped hollow concrete, arranged in a center of the at least three legs in a plan view, and including a lower end supported by the legs and an upper end thinner than the lower end; and a tower upper portion made of a steel pipe, protruding upward from the tower intermediate portion to support the wind power generator, and including a lower half portion supported by the upper end of the tower intermediate portion and an exposed body portion, wherein the tower intermediate portion has at least three flat surfaces formed at equal intervals in a circumferential direction on an outer circumferential surface of the lower end, and each leg has a flat joined surface facing the tower intermediate portion, and is fastened to the tower intermediate portion by a tensioner in a state where the joined surface is opposed to the corresponding flat surface.

2. The wind power generation tower according to claim 1, wherein a filler is filled between the joined surface of the leg and the flat surface of the tower intermediate portion.

3. The wind power generation tower according to claim 1, further comprising supporting members configured to rotatably support the legs on the foundation.

4. A construction method of the wind power generation tower according to claim 1, comprising the steps of:

constructing the tower upper portion and the tower intermediate portion in an area to be surrounded by the legs;

causing the tower upper portion to support the wind power generator;

constructing the at least three legs upward and substantially vertically;

lifting both the tower upper portion supporting the wind power generator and the tower intermediate portion to a prescribed mid-air position;

rotating the at least three legs on the foundation so as to tilt the three legs toward each other and causing upper portions of the legs to abut against the lower end of the tower intermediate portion that is in the mid-air position; and joining each of the upper portions of the legs to the lower end of the tower intermediate portion and thereby causing the tower lower portion to support the tower intermediate portion.

5. The construction method of the wind power generation tower according to claim 4, further comprising the steps of:

attaching a balance weight to the lower end of the tower intermediate portion before lifting both the tower upper portion and the tower intermediate portion to the mid-air position; and removing the balance weight from the lower end of the tower intermediate portion after joining each of the upper portions of the legs to the lower end of the tower intermediate portion.

6. The construction method of the wind power generation tower according to claim 5, wherein in the step of constructing the tower upper portion and the tower intermediate portion, arranging a nacelle of the wind power generator, and constructing the tower upper portion and the tower intermediate portion in order from a top while jacking up a constructed portion of the tower upper portion and the tower intermediate portion below the nacelle.

\* \* \* \* \*